(12) United States Patent
Orlicki

(10) Patent No.: US 8,815,996 B2
(45) Date of Patent: Aug. 26, 2014

(54) SURFACE SEGREGATING ADDITIVES FOR ENHANCED CHEMICAL AGENT RESISTANT TOPCOATS

(75) Inventor: Joshua Alan Orlicki, Havre De Grace, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 13 days.

(21) Appl. No.: 13/485,268

(22) Filed: May 31, 2012

(65) Prior Publication Data

US 2013/0018144 A1  Jan. 17, 2013

Related U.S. Application Data

(60) Provisional application No. 61/492,053, filed on Jun. 1, 2011.

(51) Int. Cl.
 *C08G 18/42* (2006.01)
(52) U.S. Cl.
 USPC ............................ 524/539; 528/363; 424/617
(58) Field of Classification Search
 None
 See application file for complete search history.

(56) References Cited

U.S. PATENT DOCUMENTS

| 6,855,773 | B1 | 2/2005 | Jensen et al. | |
| 7,560,520 | B1* | 7/2009 | Orlicki et al. | 525/540 |
| 2009/0246165 | A1* | 10/2009 | Toreki et al. | 424/78.07 |
| 2010/0304137 | A1 | 12/2010 | Orilicki et al. | |

OTHER PUBLICATIONS

Rawlett, et al., Nanoengineered Additives for Active Coatings, Army Research Laboratory, Apr. 2007, ARL-TN-273, pp. 1-10.*
Zander, et al., Orlicki, Decontamination of Chemical Agent Simulant by Nanometal Oxides, Army Research Laboratory, Jun. 2007, ARL-TR-4133 pp. 1-12.*
Chen et al., Quaternary Ammonium Functionalized Poly(propylene imine) Dendrimers as Effective Antimicrobials: Structure-Activity Studies, Aug. 1, 2000, Biomacromolecules, vol. 1 No. 3, pp. 473-480.*
IUPAC definition of aliphatic, aliphatic compounds, PAC, 1995, 67, 1307.*
Journal Article Titled "Development of Enhanced Functionality Topcoats for CBD Applications" by J. A. Orlicki, J. A. Escarsega, A. M. Rawlett, A. Farrell, W. E. Kosik, G. R. Martin, A. A. Williams, F. Levine, and J. J. La Scala of the U.S. Army Research Laboratory, J. R. Owens of the Air Force Research Laboratory, J. H. Wayne of the Naval Research Laboratory and R. A. Fry and W. R. Creasy and C. V. Giannaras of the Edgewood Chemical Biological Center, the slide presentation of which was presented at the 2010 Army Science Conference in Nov. of 2010.
Slide Presentation Titled "Development of Enhanced Functionality Topcoats for CBD Applications" by J. A. Orlicki, J. A. Escarsega, A. M. Rawlett, A. Farrell, W. E. Kosik, G. R. Martin, A. A. Williams, F. Levine, and J. J. La Scala of the U.S. Army Research Laboratory, J. R. Owens of the Air Force Research Laboratory, J. H. Wayne of the Naval Research Laboratory and R. A. Fry and W. R. Creasy and C. V. Giannaras of the Edgewood Chemical Biological Center presented at the 2010 Army Science Conference around Nov. 30, 2010.
Journal Article Titled "Nanomaterial Enable Performance Enhancements for Army Coating Composite Systems" by Joshua A. Orlicki, Andre A. Williams, Nicole E. Zander, Wendy E. Kosik, George R. Martin, Felicia Levine, John Escarsega, Alicia Farrell and Adam M. Rawlett of the U.S. Army Research Laboratory, the slide presentation of which was presented at the 240th National Meeting of the American Chemical Society in Boston, MA in Aug. 2010.
Slide Presentation Titled "Nanomaterial Enable Performance Enhancements for Army Coating Composite Systems" by Joshua A. Orlicki, Andre A. Williams, Nicole E. Zander, Wendy E. Kosik, George R. Martin, Felicia Levine, John Escarsega, Alicia Farrell and Adam M. Rawlett of the U.S. Army Research Laboratory presented at the 240th National Meeting of the American Chemical Society in Boston, MA around Aug. 24, 2010.
Orlicki, Joshua A. et al., Polymer, 2007, 48, 2818-2826.
Orlicki, Joshua A. et al., Polymer Preprint, Aug. 2005, PMSE 3778.
Hunley, M.T. et al., Langmiur, 2008, 24, 654-657.
Gao, L. et al, "The 'lotus effect' explained: two reasons why two length scales of topography are important", Langmuir, 22, 2966-2967.
Levine, F. et al, "Properties of polyurethane films modified with a fluoropolymer emulsion", Prog. Org. Coat., 69, 63-72.
Liang, J, et al., "N-halamine/quat siloxane copolymers for use in biocidal coatings", Biomaterials, 27, 2495-2501.
Makal, U et al., "Water induced hydrophobic surface", Langmuir, 21, 3742-3745.
Makal, U et al., "Polyurethanes containing oxetane-derived poly(2,2-substituted-1,3polypropylne oxide) soft blocks: copolymer effect on setting behavior", Langmuir, 21, 10749-10755.
Orlicki, J. A. et al., "Surface segregation of branched polyethyleneimines in a thermoplastic polyurethane", Polymer, 48, 2818--2826.
Rawlett, A. M. et al. "Nano-engineered additives for active coatings", ARL-TN-273 2007.
Sun, G. et al, "A new cyclic N-halamine biocidal polymeer", Ind. Eng. Chem. Res., 33, 168-170.
Sun, T. et al., "Bioinspired surfaces with special wettability", Accts. Chem Res., 38, 644-652.
Sun, Y et al;, "Novel refreshable N-halamine polymeric biocides" N-chlorination of aromatic polyamides, Ind. Eng. Chem. Res., 43, 5015-5020.
Yu-Chu Yang, et al., "Decontamination of Chemical Warfare Agents," chem. Rev. 1992, 92, 1729-1743.

(Continued)

*Primary Examiner* — Susannah Chung
*Assistant Examiner* — Robert T Butcher
(74) *Attorney, Agent, or Firm* — Christos S. Kyriakou; Eric B. Compton

(57) ABSTRACT

A topcoat having a polyfunctional scaffold in the form of a hyperbranched polymer (HBP) with a buoy group coupled to the HBP. The HBP can also have a "delivered" group and/or an anchor group coupled thereto. The buoy group can be a fluorinated chain end, one or more fluorinated and aliphatic chain ends and/or one or more wholly aliphatic chain ends. The "delivered" group can contain at least one of an ionic species, a fluorescent tag, a bioreactive site, a catalyst and the like, and the anchor group an epoxy, a (meth)acrylate or an isocyanate. The water-disbursable topcoat can also include a solubilizing group such as 2-butanone or 4-methyl-2-pentanone coupled to the HBP.

28 Claims, 3 Drawing Sheets

(56) References Cited

OTHER PUBLICATIONS

G. McDonnell, et al. "Antiseptics and Disinfectants: Activity, Action, and Resistance," Clinical Microbiology Reviews, Jan. 1999, p. 147-179.

Ye Hong, et al., "A novel processing aid for polymer extrusion: Rheology and processing of polyethylene and hyperbranched polymer blends," J. Rheol. 43(3), May/Jun. 1999, 781-793.

Dirk Schmaljohann, et al., "Modification with alkyl chains and the influence on thermal and mechanical properties of aromatic hyperbranched polyesters," Macromol. Chem. Phys. 201, 49-57 (2000).

Chen, et al., "Quaternary Ammonium Functionalized Poly(propylene imine) Dendrimers as Effective Antimicrobials: Structure-Activity Studies," Biomacromolecules 2000, 1, 473-480.

Y. Hong, et al., "Film blowing of linear low-density polyethylene blended with a novel hyperbranched polymer processing aid," Polymer 41 (2000) 7705-7713.

Chen, et al., "Interactions between dendrimer biocides and bacterial membranes," Biomaterials 23 (2002) 3359-3368.

Milovic, et al., "Immobilized N-Alkylated Polyethylenimine Avidly Kills Bacteria by Rupturing Cell Membranes With No Resistance Developed," Published online Mar. 31, 2005 in Wiley InterScience (www.interscience.wiley.com). DOI: 10.1002/bit.20454.

S.S. Talmage, et al., "Chemical Warfare Agent Degradation and Decontamination," Current Organic Chemistry, 2007, 11, 285-298.

Gabi Amitai, et al., "Decontamination of chemical and biological warfare agents with a single multi-functional material," Biomaterials 31 (2010) 4417-4425.

* cited by examiner

SURFACE SEGREGATING ADDITIVES FOR ENHANCED CHEMICAL AGENT RESISTANT TOPCOATS

CROSS-REFERENCES TO RELATED APPLICATIONS

This application claims the benefit of U.S. Provisional patent application Ser. No. 61/492,053 titled "Surface Segregating Additives for Enhanced Chemical Agent Resistant Topcoats" filed on Jun. 1, 2011 listing Dr. Joshua A. Orlicki as a sole inventor, the entire contents, including all attachments and appendices of which are hereby incorporated herein by reference.

GOVERNMENT INTERESTS

The invention described herein may be manufactured, used, and licensed by or for the United States government.

FIELD OF THE INVENTION

The present invention relates to a modifier for either a water-dispersible or solvent-borne topcoat for a chemical agent resistant coating, and in particular to a two-component polymer topcoat having an additive comprised of a polyfunctional scaffold with a buoy group coupled to the polyfunctional scaffold.

BACKGROUND OF THE INVENTION

Military vehicles and support equipment are known to use or employ chemical agent resistant coatings (CARC) to minimize absorption of chemical warfare agents (CWAs) in the event of battlefield exposure. Presently, current technology provides passive protection, but there is no inherent self-decontaminating capability. Therefore, a chemical agent resistant coating that has the ability to at least partially self-clean, and thereby reduce a logistical footprint associated with decontamination operations, would be desirable.

SUMMARY OF THE INVENTION

A modifier for either a water-dispersible or solvent-borne topcoat for a chemical agent resistant coating (CARC) is provided. The topcoat can include either one-component or a two-component polymer paint or coating incorporating an additive having a polyfunctional scaffold in the form of a hyperbranched polymer (HBP) and a buoy group coupled to the polyfunctional scaffold. The HBP can be an $AB_2$ type condensation system that has points of functionalization at B groups of the $AB_2$ type condensation system. In addition, the HBP can have a poyethyleneimine backbone, a polyester backbone and the like. Hyperbranched materials prepared by radical mechanisms may also be suitable for use in this invention, although fractional coupling of functional moieties to the end groups of these polymers may be more challenging to control.

The buoy group can contain fluorinated chain ends, siloxane chain ends (e.g. oligo-polydimethylsiloxane-based chain ends), fluorinated and aliphatic chain ends and/or wholly aliphatic chain ends. In some instances, a fluorinated chain end can be the ester or amide of a poly-fluorinated species such as perfluorooctanoic acid ($HOCOC_7F_{15}$, PFOA) or a longer-chain acid; and an aliphatic chain end can be the ester or amide of lauric acid ($HOCOC_{11}H_{23}$), palmitic acid ($HOCOC_{15}H_{31}$), stearic acid ($HOCOC_{17}H_{35}$) or behenic acid ($HOCOC_{21}H_{43}$). However, it is appreciated that any chain end of sufficiently low surface energy (n) relative to its deposition solvent and matrix can serve as a buoy group.

The additive for the water-dispersible or solvent-borne topcoat can also include a "delivered" group that is coupled to the HBP, which provides a functional aspect of the additive to the system. The delivered group can contain at least one of an ionic species, a fluorescent tag, a bioreactive site, a catalyst and the like. For example and for illustrative purposes only, the delivered group can be a catalyst in the form of a gold containing nanoparticle for sensing applications, a silver containing nanoparticle for antimicrobial applications, a titania containing nanoparticle for light-activated self-cleaning applications, and the like. However, it is appreciated by those skilled in the art that a wide variety of nanoparticles would be suitable for attachment to the HBP-based additive.

In addition to the above, fluorescent tags such as pyrene butyric acid and similar compounds that are useful in the development of fluorescence quenching assays can be a delivered group, as can larger aromatics such as the class of phthalocyanines or fluoresceins. It is also appreciated by those skilled in the art that functionalization of the HBP core is useful for fluorescent molecules to both control their distribution in the bulk matrix and also control their local concentration. For example, high loading on the HBP core can induce excimer formation and other coupled fluorescence effects, while low loading can reduce the occurrence of intermolecular interaction.

Suitable ionic groups for delivery can include quaternary ammonium salts known to those skilled in the art, especially those suitable for antimicrobial applications, or in the alternative, groups like N-oximes, zwitterionic species and the like. With respect to repellant or self-cleaning additives, a buoy group can also serve as an "active" or "delivered" group. For example, an HBP functionalized with both lauric and behenic acid esters can be largely solubilized by lauric ester chain ends, while both chain ends can provide a driving force to maximize additive concentration at the air interface of the matrix. In addition, long chain behenic esters can dominate properties at a surface of the topcoat while long aliphatic chains crystallize and reduce susceptibility to wetting by environmental contaminants.

The additive to the water-dispersible topcoat can also include an anchor group coupled to the HBP core. The anchor group provides a means to permanently fix the additive in the matrix upon curing or drying. However, it is appreciated that the kinetics of this reaction must be controlled to allow for migration to an air interface. For example and for illustrative purposes only, the anchor group can be an epoxy, a (meth)acrylate, an isocyanate and the like; in a polyurethane system such as a CARC, the anchor can be a residual unreacted alcohol or amine that is native to the polyester or polyethyleneimine HBP core, respectively.

To improve dispersion in the water-dispersible topcoat, the HBP additive can also be suspended or dissolved in a compatible solvent, for example the solvent can be 2-butanone, 4-methyl-2-pentanone, various alcohols and the like.

In some instances, the HBP coupled with the buoy group, delivered group and/or anchor group can afford increased hydrophobicity and/or oleophobicity to the surface of the topcoat, depending on the identity of the buoy and delivered groups. In addition, the use of similar HBPs can provide different levels of hydrophobicity depending on their core molecular weight. For example, a first HBP having a relatively high core molecular weight can provide increased hydrophobicity compared to a second HBP that has a core with a relatively low molecular weight relative to the first HBP.

The present invention also provides a method for reducing the spread of a chemical agent, for example blister chemical agent 2,2'-dichlorodiethyl sulfide also known as sulfur mustard or nerve agent O-ethyl S-2-(diisopropylamino)ethyl methylphosphonothiloate also known as VX nerve agent, on a polyurethane containing surface on an object, wherein the method comprises including an additive in a polyurethane containing formulation, the additive comprising a functionalized hyperbranched polymer (HBP) having a polyfunctional scaffold in the form of a hyperbranched polymer (HBP); and a buoy group coupled to said polyfunctional scaffold, said buoy group containing at least one aliphatic chain end and a fluorinated chain end; and applying the polyurethane containing formulation to a surface of an object. In certain embodiments, the HBP is a radically-grown HBP and said HBP has at least one of a poyethyleneimine backbone and a polyester backbone. In certain desirable embodiments, the fluorinated chain end is perfluorooctanoic acid and said aliphatic chain end is selected from a group consisting of an ester or amide of $COC_{11}H_{23}$, $COC_{15}H_{31}$, $COC_{17}H_{35}$, and $COC_{21}H_{43}$. The additive may further comprise a delivered group coupled to said HBP, said delivered group selected from a group consisting of an ionic species, a fluorescent tag, a bioreactive site and a catalyst. The additive may further comprise an anchor group coupled to said HBP, said anchor group selected from a group consisting of an epoxy, a (meth) acrylate, an isocyanate, a residual unreacted alcohol native to said HBP and a residual unreacted amine native to said HBP.

DETAILED DESCRIPTION OF THE PRESENT INVENTION

A water-dispersible or solvent-borne topcoat that is at least partially self-cleaning with respect to chemical warfare agents is provided. As such, the water-dispersible or solvent-borne topcoat disclosed herein has use as a topcoat for a military vehicle as well as a protective coating for maritime and architectural applications, for textiles in general and soldier clothing in particular, and surfaces of miscellaneous tactical assets.

Figure 1:
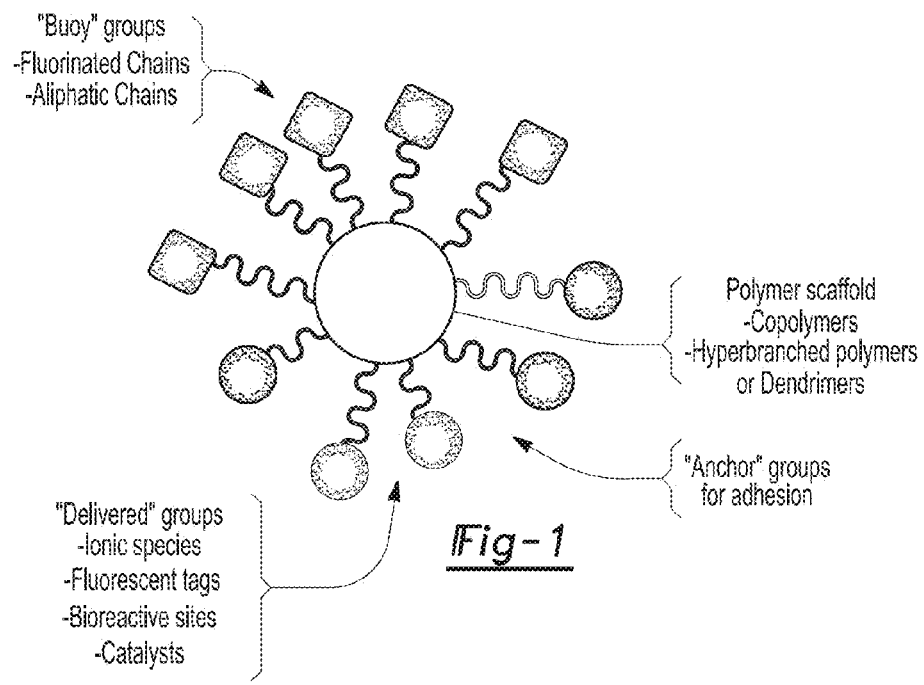
FIG. 1 is schematic illustration of the additive, comprising a polyfunctional scaffold in the form of a hyperbranched polymer (HBP) that has a buoy group, a delivered group and an anchor group coupled thereto.

The topcoat can include an additive that has a polyfunctional scaffold in the form of a hyperbranched polymer (HBP) with a buoy group coupled to the HBP. In some instances, the HBP can also have a "delivered" group, an anchor group and/or a solubilizing group coupled thereto as illustratively shown in FIG. 1.

The HBP can be an $AB_2$ type condensation system with B groups of the $AB_2$ type condensation system providing functionalization points for the HBP. For example and for illustrative purposes only, the HBP can be or have a poyethyleneimine backbone, a polyester backbone and the like.

The performance of the HBP can be influenced by the core molecular weight of the HBP. As one example, two of the Boltorn line of hyperbranched polyesters produced by Perstorp, which has a range of grades from the H20 (1750 g/mol nominal weight) to the H50 (ca. 10 kg/mol nominal weight) were partially funcationalized (ca. 20% PFOA-ester, 20% lauric ester) and blended into a thermoplastic polyurethane film. The H20-based material exhibited a lower contact angle with water (~59°) while the H50-based material exhibited a higher contact angle with water (~90°). In addition, the surface composition of these materials determined with X-ray photoelectron spectroscopy was very similar, and as such the key determinant to the surface behavior was concluded to be the molecular weight of the HBP core.

The additive can be used to provide a desired property to the surface of the topcoat, for example an increase in hydrophobicity. In addition, the behavior of the additive can be controlled by the selected buoy group, which can be a fluorinated chain end, and aliphatic chain end and/or a combination of the two. For example and for illustrative purposes only, a fluorinated chain end that serves as a buoy group that is coupled to the HBP can be the ester or amide of perfluorooctanoic acid ($HOCOC_7F_{15}$). In addition, an aliphatic chain end could be coupled via an ester or amide bond and be based on aliphatic acids such as of lauric ($HOCOC_{11}H_{23}$), palmitic ($HOCOC_{15}H_{31}$), stearic ($HOCOC_{17}H_{35}$), or behenic acids ($HOCOC_{21}H_{43}$).

In addition to the buoy group, the additive may be functionalized with a delivered group that can be used to couple an ionic species, a fluorescent tag, a bioreactive site and/or a catalyst to the HBP. In this manner, the chemical reactivity of the water-dispersible topcoat can be tailored to react more or less with a particular component or components that may come into contact therewith.

Regarding an anchor group that is coupled to the HBP, the anchor group allows for covalent bonding to the topcoat matrix. Depending on the necessary chemistry, non-functionalized chain ends can directly react to the matrix, or may be used to install reactive moieties to the chain ends of the HBP, for example by coupling an epoxy, a (meth)acrylate and/or an isocyanate to the HBP. The HBP can also have a solubilizing group coupled thereto in order to afford greater solubility of the HBP. The solubilizing group is typically chosen relative to the intended solvent, such a solubilizing group illustratively including the lauric acid ester or amide to impart solubility in non-polar solvents; the ester or amide of an oligo-ethylene glycol can be suitable to impart solubility in polar solvents such as water; amphiphilic solubilizing groups such as the ester or amide of the glycol ethoxylate lauryl ether can impart solubility in both polar and non-polar solvents.

Figure 2:
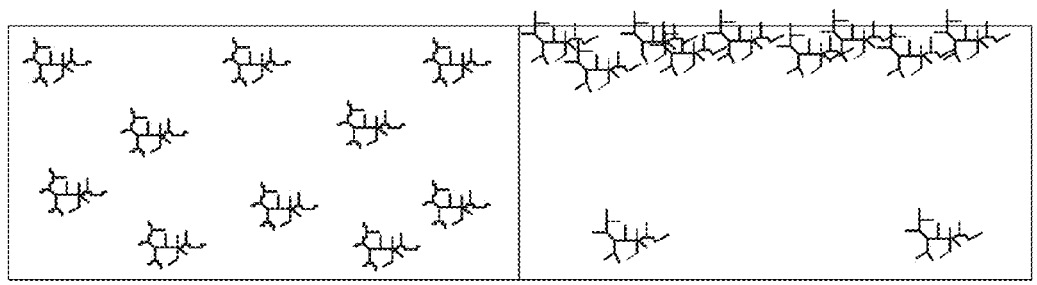
FIG. 2 is a schematic illustration of an additive to a coating having bulk distribution versus an additive distribution for coating having surface segregation according to an embodiment of the present invention.

It is appreciated that the HBP with the buoy group, delivered group, anchor group and/or solubilizing group coupled thereto can afford for segregation of the HBP to an upper or outer surface of the topcoat formulation as illustratively shown in FIG. 2 and thereby result in a desired property of the surface to be obtained. In addition, and in order to provide an illustrative example of the invention and yet not limit the scope in any way, at least one example of such a formulation is provided below.

EXAMPLES

Table 1 provides a list of four water-dispersible topcoat compositions according to one or more embodiments of the present invention. The two soluble compositions (SA-1, SA-2) had an HBP with buoy groups of fluorinated chain ends and aliphatic chain ends coupled thereto while the two water-dispersible compositions (DA-1, DA-2) had an HBP with only aliphatic ester chain ends attached thereto.

The identifiers SA-1 and DA-1 correspond to an HBP prepared from the Boltorn H20 core whereas the identifiers SA-2 and DA-2 correspond to the same HBP chain end composition prepared from the Boltorn H50 core, and therefore having a higher core molecular weight. Both of the solvent-borne HBP samples (SA-1, SA-2) had a buoy group of perfluorooctanoic esters (PFOA) coupled thereto. In addition, each of the HBP samples had the aliphatic ester chain ends of —OCOC$_{11}$H$_{23}$ (C$_{12}$) coupled thereto. In contrast, both of the water-dispersible HBP samples (DA-1, DA-2) had the aliphatic ester chain ends of —OCOC$_{11}$H$_{23}$ (C$_{12}$) and —OCOC$_{21}$H$_{43}$ (C$_{22}$) attached thereto with no PFOA present. It should be appreciated that Table 1 provides the mole fraction (Mol$_f$) of chain ends that were coupled with the fluorinated buoy group and the aliphatic buoy groups. In addition, the chain end functionalization is a mole fraction based on the known repeat unit mass of the HBP core.

TABLE 1

| Identifier | Core MW | Mol$_f$PFOA | Mol$_f$C$_{12}$ | Mol$_f$C$_{22}$ |
|---|---|---|---|---|
| SA-1 | H20 | 0.206 | 0.707 | 0.00 |
| SA-2 | H50 | 0.203 | 0.730 | 0.00 |
| DA-1 | H20 | 0.00 | 0.441 | 0.446 |
| DA-2 | H50 | 0.00 | 0.458 | 0.450 |

The expression of extent of end functionalization as a fraction of chain ends is suitable for AB$_x$ type polycondensates, where the number of available chain ends scales with the degree of polymerization, n. Neglecting the potential for cyclization during polymerization, the number of chain ends will scale with degree of polymerization such that the number of residual sites is n(x−1)+1; or in the case of an AB$_2$-type HBP, n(2-1)+1=n(1)+1, and the number of chain ends scales with degree of polymerization. As such, the number of B groups per chain was n+1 barring any cyclization events.

The polymers shown in Table 1 were dissolved (SA-1, SA-2) or dispersed (DA-1, DA-2) in 4-methyl-2-pentanone with a loading of approximately 1.5 grams of additive into 3 grams of solvent. This mixture was then combined with a two-component polyurethane formulation with moderate titania loading for pigmentation. The additives were disbursed through the two-component polyurethane formulation using high-shear mixing and then the solution was sprayed onto both glass panels and tin-coated steel. The samples were then allowed to dry and cure at room temperature for a minimum of seven days.

The surfaces of the sprayed panels and tin-coated steel were analyzed using contact angle analysis and X-ray photoelectron spectroscopy (XPS). The contact angle analysis provided a relative measure of hydrophobicity and the X-ray photoelectron spectroscopy provided a measure of surface composition.

Figure 3:
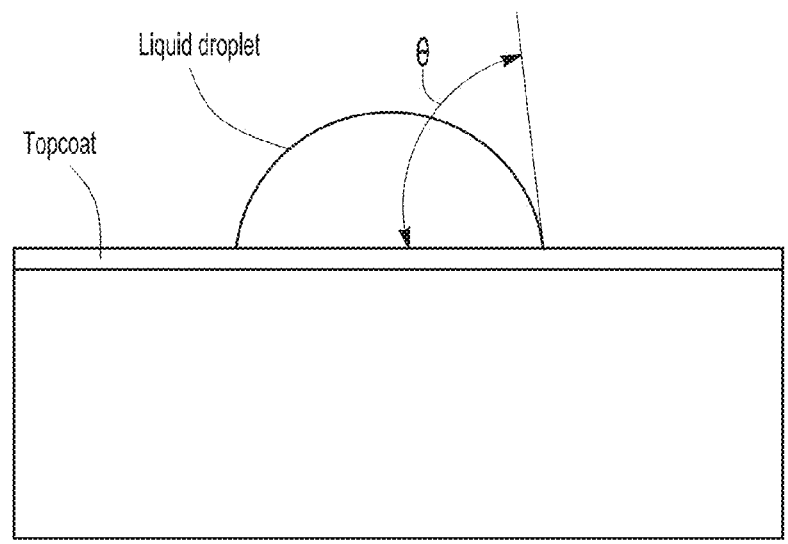
FIG. 3 is a schematic drawing illustrating a contact angle between a liquid droplet and a topcoat coating.

Table 2 provides results of the contact angle analysis and X-ray photoelectron spectroscopy for a reference coating that contained no additives and the SA-1, SA-2, DA-1 and DA-2 coatings. As shown in Table 2, the composition of the surface of the SA-1 and SA-2 sprayed panels was substantially altered with respect to fluorine (F) and nitrogen (N), and the SA-1 sample showed an increase in silicon (Si). Furthermore, the average contact angle, as defined by the angle θ shown in FIG. 3, for a drop of water on the coatings shifted approximately 24 degrees with respect to the reference coating, thereby indicating an increase in net hydrophobicity. In contrast, the dispersible additives shifted the contact angle only slightly and the trend was towards a more hydrophilic nature. It should also be appreciated that the SA-2 and DA-2 samples, having the greater core molecular weight (H50), performed better than the corresponding two additives with the lower molecular weight (H20) core.

TABLE 2

| Sample | XPS Atomic Concentration (%) | | | | | Contact Angle (θ) |
|---|---|---|---|---|---|---|
|  | C | F | N | O | Si |  |
| Reference Coating | 72.46 | 0.00 | 5.92 | 20.24 | 1.38 | 62.73 |
| SA-1 | 68.93 | 1.18 | 0.92 | 19.85 | 9.12 | 87.26 |
| SA-2 | 74.24 | 6.31 | 0.55 | 18.52 | 0.38 | 85.41 |
| DA-1 | 69.86 | 0.00 | 5.45 | 19.96 | 4.73 | 56.64 |
| DA-2 | 73.76 | 0.00 | 4.36 | 19.67 | 2.22 | 59.90 |

Figure 4:
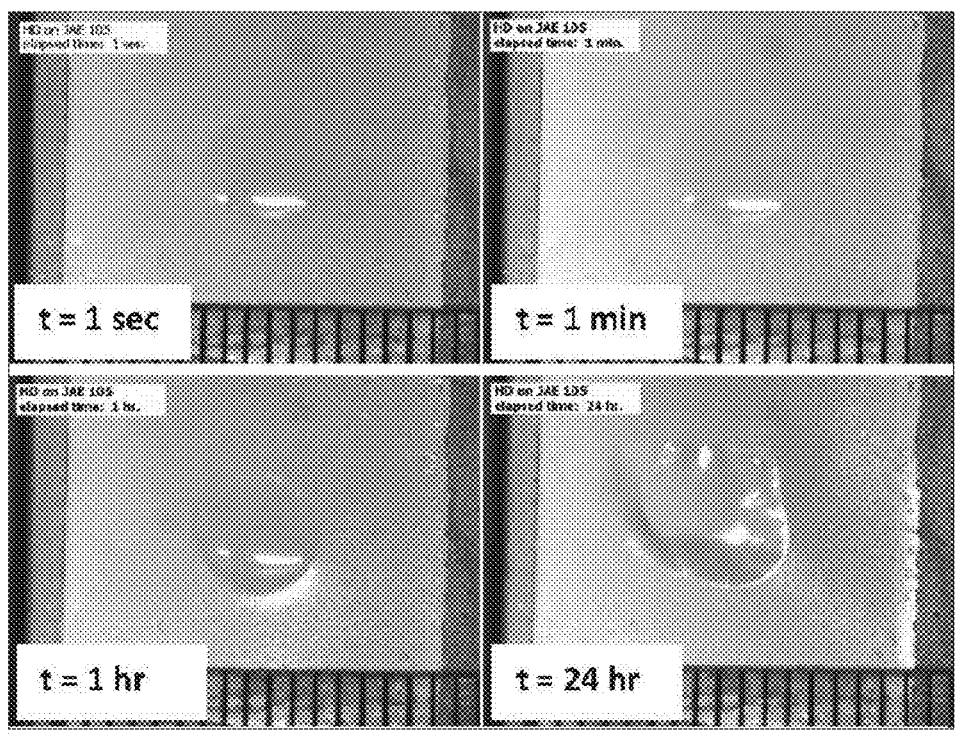
FIG. 4 is a series of time-lapse photographs of HD sorption onto a baseline polyurethane coating.
Figure 5:
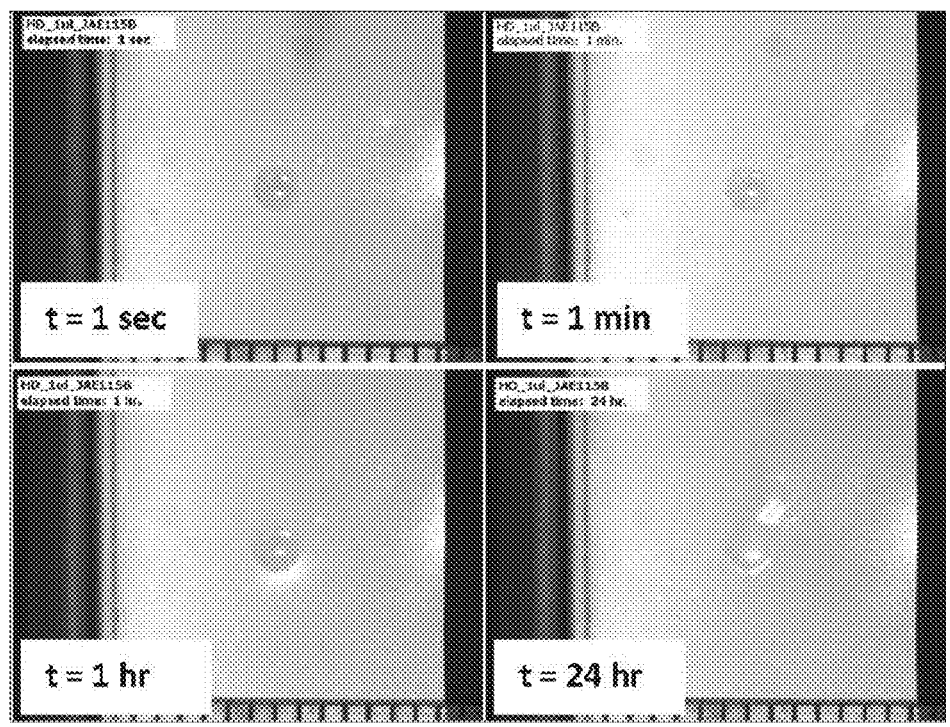
FIG. 5 is a series of time-lapse photographs of HD sorption on a modified coating according to an embodiment of the present invention designated SA-2.
Figure 6:
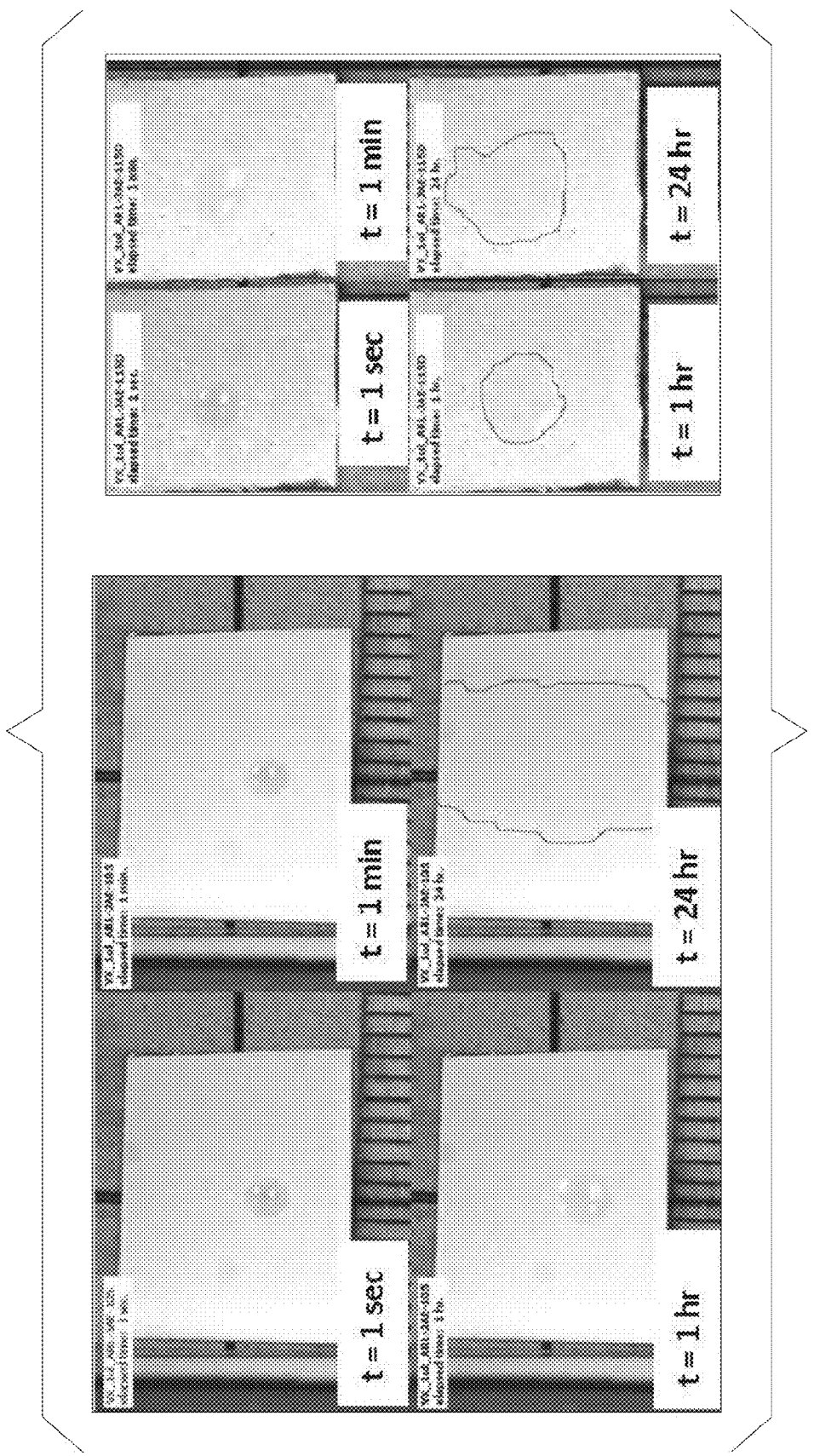
FIG. 6 is a series of time-lapse photographs of VX sorption on: (A) a baseline polyurethane coating and (B) a modified coating according to an embodiment of the present invention designated DA-2.

Actual testing of coated panels against a blister chemical agent (HD, 2,2'-dichlorodiethyl sulfide) and a nerve agent (VX, O-ethyl S-2-(diisopropylamino)ethyl methylphosphonothiolate) also showed improved performance of the solvent-borne and water-dispersible coatings compared to the reference coating with performance of the coatings measured as a function of the total area of spread or coverage of the HD agent or VX agent over a period of up to 24 hours. For example, FIGS. 4 and 5 show a series of time-lapse photographs for the HD agent on a baseline polyurethane coating and an SA-2 coating, respectively, while FIGS. 6(A) and 6(B) show a series of time-lapse photographs for the VX agent on a baseline polyurethane coating and a DA-2 coating, respectively. As illustrated by the photographs, a significant decrease in area covered by the agents was observed by the modified coatings in comparison to the baseline coating. In addition, the DA-2 coating performing the best of all the coatings tested.

The schematic below provides three illustrated embodiments for buoy groups coupled to an HBP.

$$\begin{array}{c} \text{HO-CO-C}_7\text{H}_{15} \\ \text{HO-CO-C}_{11}\text{H}_{43} \end{array} \xrightarrow[\text{4 hrs}]{175°\text{C., N}_2} \begin{array}{l} R = 20\% \text{ COC}_7\text{F}_{15} \\ \phantom{R = } 20\% \text{ COC}_{11}\text{H}_{23} \\ \phantom{R = } 60\% \text{ H} \end{array}$$

It is appreciated that the HBP structure shown on the left is drawn linearly to represent the remaining chain end that is left over after polymerization, thereby leading to n chain ends where n is the degree of polymerization. As a result, end group functionalization is typically expressed as a fraction or percentage of consumed chain ends as provided by the relative percentages on the right side of the diagram (percentages represent [# end groups functionalized/n]). For the top embodiment in which the HBP structure is coupled with perfluorooctanoic acid and illustrates a generic functionalization of a solvent-borne composition, it is appreciated that the PFOA acts as its own catalyst when this reaction occurs. However, for the bottom two embodiments in which the HBP structure is coupled with two aliphatic chains and illustrates water-dispersible compositions, it is appreciated at p-toluenesulfonic acid can be included in a catalytic quantity to drive the transesterification reaction. In addition, the schematic illustrates that the HBP structure can have fluorinated and aliphatic end chains, or in the alternative wholly aliphatic end chains.

In certain embodiments, the present invention provides a method for reducing the spread and/or contact area of a chemical agent on a surface, particularly a chemical warfare agent such as a nerve agent or a chemical blister agent. Thus, the present invention provides a method of making a self-decontaminating surface. In certain desirable embodiments, the present invention provides a self-decontaminating surface and/or a surface that reduces the spread and/or the contact area of a chemical warfare agent on a painted surface without significantly reducing other performance aspects, such as corrosion resistance and/or abrasion resistance, of the paint on the surface of the object that is to be protected.

The following articles and presentations are hereby incorporated by reference herein: the article and the slide presentation titled "Nanomaterial Enable Performance Enhancements for Army Coating Composite Systems" by Joshua A. Orlicki, Andre A. Williams, Nicole E. Zander, Wendy E. Kosik, George R. Martin, Felicia Levine, John Escarsega, Alicia Farrell and Adam M. Rawlett of the U.S. Army Research Laboratory, the slide presentation of which was presented at the 240th National Meeting of the American Chemical Society in Boston, Mass. in August 2010; and the article and the slide presentation titled "Development of Enhanced Functionality Topcoats for CBD Applications" by J. A. Orlicki, J. A. Escarsega, A. M. Rawlett, A. Farrell, W. E. Kosik, G. R. Martin, A. A. Williams, F. Levine, and J. J. La Scala of the U.S. Army Research Laboratory, J. R. Owens of the Air Force Research Laboratory, J. H. Wayne of the Naval Research Laboratory and R. A. Fry and W. R. Creasy and C. V. Giannaras of the Edgewood Chemical Biological Center, the slide presentation of which was presented at the 2010 Army Science Conference in November of 2010.

The foregoing descriptive is illustrative of particular embodiments of the invention, but it is not meant to be a limitation upon the practice thereof. The following claims, including all equivalents thereof, are intended to define the scope of the invention.

I claim:

1. A topcoat for a chemical warfare agent resistant coating (CARC) having a modifier in the form of a functionalized hyperbranched polymer (HBP), said topcoat comprising:
a one-component or two-component polymer paint or coating; and
an additive comprising a functionalized hyperbranched polymer (HBP) having a polyfunctional scaffold in the form of a hyperbranched polymer (HBP); and at least one buoy group coupled to said polyfunctional scaffold, said buoy group containing at least one long aliphatic chain end selected from a group consisting of an ester or amide of palmitic acid ($HOCOC_{15}H_{31}$), stearic acid ($HOCOC_{17}H_{35}$) and behenic acid ($HOCOC_{21}H_{43}$);
wherein the long aliphatic chain end functionalization of said HBP are crystalline and reduce surface spread of a chemical warfare agent across the surface of said paint or coating; and
wherein said additive to enhances the resistance and repellency of said paint or coating to chemical warfare agents.

2. The topcoat of claim 1, wherein said HBP is a radically-grown HBP.

3. The topcoat of claim 1, wherein said HBP has at least one of a polyethyleneimine backbone and a polyester backbone.

4. The topcoat of claim 3, wherein said topcoat is a solvent-borne top coat and said buoy group contains a fluorinated chain end and aliphatic chain end.

5. The topcoat of claim 4, wherein said fluorinated chain end is perfluorooctanoic acid.

6. The topcoat of claim 1, wherein said topcoat is a water-dispersible topcoat and said buoy group is a wholly aliphatic chain end without any fluorinated chain ends.

7. The topcoat of claim 1, wherein said additive further comprises a delivered group coupled to said HBP.

8. The topcoat of claim 1, wherein said additive further comprises an anchor group coupled to said HBP.

9. The topcoat of claim 1, wherein said additive further comprises a solubilizing group coupled to said HBP.

10. The topcoat of claim 1, wherein said chain end functionalization of said HBP ranges from approximately 88.7% to approximately 93.3%.

11. The topcoat of claim 1, wherein said polymer paint or coating is a polyurethane containing formulation, and wherein said buoy group contains at least one aliphatic chain end and a fluorinated chain end.

12. The topcoat of claim 1, wherein the at least one selected long aliphatic chain end is behenic acid.

13. The topcoat of claim 1, wherein the chemical warfare agent comprises a blister chemical agent or a nerve agent.

14. The topcoat of claim 1, wherein the additive comprises 2% by mass of the paint or coating.

15. The topcoat of claim 6, wherein said chain end functionalization of said HBP is approximately 90%.

16. The topcoat of claim 7, wherein said delivered group is selected from a group consisting of an ionic species, a fluorescent tag, a bioreactive site and a catalyst.

17. The topcoat of claim 16, wherein said delivered group is an ionic species selected from a group consisting of a quaternary ammonium salt, an N-oxime and a zwitterionic species.

18. The topcoat of claim 16, wherein said delivered group is a fluorescent tag selected from a group consisting of pyrene butyric acid, a phthalocyanine and a fluorescein.

19. The topcoat of claim 16, wherein said delivered group is a catalyst in the form of a nanoparticle.

20. The topcoat of claim 8, wherein said anchor group is selected from a group consisting of an epoxy, a (meth)acrylate, an isocyanate, a residual unreacted alcohol native to said HBP and a residual unreacted amine native to said HBP.

21. A topcoat for a chemical warfare agent resistant coating (CARC) comprising:
a one-component or two-component polymer paint or coating, and
an additive comprising
a functionalized hyperbranched polymer (HBP) having a polyfunctional scaffold in the form of a hyperbranched polymer (HBP);
a buoy group coupled to said HBP, said buoy group containing at least one fluorinated chain end and at least one long aliphatic chain end selected from a group consisting of an ester or amide of palmitic acid ($HOCOC_{15}H_{31}$), stearic acid ($HOCOC_{17}H_{35}$) and behenic acid ($HOCOC_{21}H_{43}$); and
optionally, a delivered group and/or an anchor group coupled to said HBP;
wherein the long aliphatic chain end functionalization of said HBP are crystalline and reduce surface spread of a chemical warfare agent across the surface of said paint or coating; and
wherein said additive to enhances the resistance and repellency of said paint or coating to chemical warfare agents.

22. The topcoat of claim 21, wherein said fluorinated chain end is $COC_7F_{15}$.

23. The topcoat of claim 21, wherein said buoy group is a plurality of buoy groups that contain a fluorinated chain end and an aliphatic chain end.

24. A method for reducing the spread of a chemical warfare agent on a polyurethane containing surface on an object, the method comprising:
applying the topcoat of claim 11 to a surface of an object.

25. The method of claim 24 wherein the HBP is a radically-grown HBP and said HBP has at least one of a polyethyleneimine backbone and a polyester backbone.

26. The method of claim 24 wherein said fluorinated chain end is perfluorooctanoic acid.

27. The method of claim 24 wherein said additive further comprises a delivered group coupled to said HPB, said delivered group selected from a group consisting of an ionic species, a fluorescent tag, a bioreactive site and a catalyst.

28. The method of claim 24 wherein said additive further comprises an anchor group coupled to said HBP, said anchor group selected from a group consisting of an epoxy, a (meth)acrylate, an isocyanate, a residual unreacted alcohol native to said HBP and a residual unreacted amine native to said HBP.

* * * * *